US008009013B1

(12) United States Patent
Hirschfeld et al.

(10) Patent No.: US 8,009,013 B1
(45) Date of Patent: Aug. 30, 2011

(54) ACCESS CONTROL SYSTEM AND METHOD USING USER LOCATION INFORMATION FOR CONTROLLING ACCESS TO A RESTRICTED AREA

(75) Inventors: Robert A. Hirschfeld, Austin, TX (US); Michael K. Cation, Austin, TX (US)

(73) Assignee: Precision Control Systems of Chicago, Inc.

( * ) Notice: Subject to any disclaimer, the term of this patent is extended or adjusted under 35 U.S.C. 154(b) by 1012 days.

(21) Appl. No.: 11/859,145

(22) Filed: Sep. 21, 2007

(51) Int. Cl.
*G05B 19/00* (2006.01)

(52) U.S. Cl. ........ 340/5.2; 340/5.8; 340/5.81; 340/5.82; 340/5.83; 340/5.84; 340/5.85; 340/539.13; 340/572.1; 235/375; 235/376

(58) Field of Classification Search .................. 340/5.2, 340/5.8, 5.81–5.85, 572.1, 539.13; 713/168; 235/375–376
See application file for complete search history.

(56) References Cited

U.S. PATENT DOCUMENTS 5,337,043 A * 8/1994 Gokcebay .................... 340/5.67
5,628,004 A 5/1997 Gormley et al.
5,774,059 A * 6/1998 Henry et al. ................ 340/5.54
5,878,434 A 3/1999 Draper et al.
5,903,225 A * 5/1999 Schmitt et al. ............... 340/5.25
5,924,096 A 7/1999 Draper et al.
5,936,544 A 8/1999 Gonzales et al.
6,496,595 B1 12/2002 Puchek et al.
6,547,130 B1 * 4/2003 Shen ............................ 235/380
6,570,498 B1 * 5/2003 Frost et al. .................... 340/540
6,617,970 B2 * 9/2003 Makiyama et al. ........ 340/573.1
6,624,739 B1 * 9/2003 Stobbe ........................... 340/5.2
6,720,874 B2 * 4/2004 Fufido et al. .................. 340/541
6,724,296 B1 * 4/2004 Hikita et al. ................. 340/5.61
6,747,564 B1 * 6/2004 Mimura et al. .............. 340/5.52
6,966,491 B2 * 11/2005 Gyger ........................... 235/382
6,990,407 B1 * 1/2006 Mbekeani et al. ............ 701/117
7,080,402 B2 * 7/2006 Bates et al. ....................... 726/2
7,096,354 B2 * 8/2006 Wheeler et al. ............... 713/155
7,283,050 B2 * 10/2007 Minowa ..................... 340/572.1
7,372,839 B2 * 5/2008 Relan et al. .................. 370/338
7,375,615 B2 * 5/2008 Kitagawa et al. ............ 340/5.81
7,407,110 B2 * 8/2008 Davis et al. .............. 235/472.02
7,468,658 B2 * 12/2008 Bouressa .................. 340/539.1
7,598,842 B2 10/2009 Landram et al.
7,698,566 B1 * 4/2010 Stone ........................... 713/186
7,817,047 B1 * 10/2010 Brignone et al. .......... 340/573.4
(Continued)

FOREIGN PATENT DOCUMENTS

WO WO 2005083210 A1 * 9/2005

*Primary Examiner* — Benjamin C Lee
*Assistant Examiner* — Quang Pham
(74) *Attorney, Agent, or Firm* — Gary R. Stanford

(57) ABSTRACT

A method of controlling access to a restricted area including receiving location information from at least one supplemental tracking source which tracks location of an authorized user, and controlling access by the authorized user to a restricted area based on the location information. The method may further include maintaining a muster based on the location information. A physical access control system for controlling access to a restricted area including a user location information system and an access system which controls access based on the location information. The user location information system may further maintain a muster based on the location information. The user location information system receives location information indicating location of an authorized user from at least one supplemental tracking source.

16 Claims, 2 Drawing Sheets

U.S. PATENT DOCUMENTS

| | | | | |
|---|---|---|---|---|
| 7,818,783 | B2 * | 10/2010 | Davis | 726/2 |
| 2002/0016740 | A1 * | 2/2002 | Ogasawara | 705/26 |
| 2002/0059523 | A1 * | 5/2002 | Bacchiaz et al. | 713/200 |
| 2002/0091745 | A1 | 7/2002 | Ramamurthy et al. | |
| 2002/0094777 | A1 * | 7/2002 | Cannon et al. | 455/41 |
| 2002/0133725 | A1 * | 9/2002 | Roy et al. | 713/202 |
| 2002/0137524 | A1 * | 9/2002 | Bade et al. | 455/456 |
| 2003/0004737 | A1 * | 1/2003 | Conquest et al. | 705/1 |
| 2003/0023882 | A1 * | 1/2003 | Udom | 713/202 |
| 2003/0046260 | A1 | 3/2003 | Satyanarayanan et al. | |
| 2003/0056096 | A1 | 3/2003 | Albert et al. | |
| 2003/0085914 | A1 * | 5/2003 | Takaoka et al. | 345/734 |
| 2003/0093690 | A1 | 5/2003 | Kemper | |
| 2003/0179073 | A1 * | 9/2003 | Ghazarian | 340/5.6 |
| 2003/0182194 | A1 * | 9/2003 | Choey et al. | 705/16 |
| 2003/0217122 | A1 * | 11/2003 | Roese et al. | 709/219 |
| 2003/0218533 | A1 * | 11/2003 | Flick | 340/5.22 |
| 2003/0233278 | A1 * | 12/2003 | Marshall | 705/14 |
| 2004/0017929 | A1 * | 1/2004 | Bramblet et al. | 382/103 |
| 2004/0036574 | A1 * | 2/2004 | Bostrom | 340/5.82 |
| 2004/0049675 | A1 * | 3/2004 | Micali et al. | 713/158 |
| 2004/0067773 | A1 * | 4/2004 | Rachabathuni et al. | 455/560 |
| 2004/0140899 | A1 * | 7/2004 | Bouressa | 340/573.1 |
| 2004/0153671 | A1 * | 8/2004 | Schuyler et al. | 713/201 |
| 2004/0203633 | A1 * | 10/2004 | Knauerhase et al. | 455/414.1 |
| 2004/0261478 | A1 * | 12/2004 | Conforti | 70/277 |
| 2005/0038791 | A1 | 2/2005 | Ven | |
| 2005/0061883 | A1 * | 3/2005 | Miller et al. | 235/440 |
| 2005/0171787 | A1 * | 8/2005 | Zagami | 705/1 |
| 2005/0241003 | A1 * | 10/2005 | Sweeney et al. | 726/28 |
| 2005/0255840 | A1 * | 11/2005 | Markham | 455/422.1 |
| 2005/0259606 | A1 * | 11/2005 | Shutter et al. | 370/317 |
| 2005/0274793 | A1 * | 12/2005 | Cantini et al. | 235/379 |
| 2005/0284931 | A1 * | 12/2005 | Adams et al. | 235/382 |
| 2006/0013234 | A1 | 1/2006 | Thomas et al. | |
| 2006/0022794 | A1 * | 2/2006 | Determan et al. | 340/5.52 |
| 2006/0048233 | A1 | 3/2006 | Buttross et al. | |
| 2006/0055510 | A1 | 3/2006 | Little et al. | |
| 2006/0059099 | A1 | 3/2006 | Ronning et al. | |
| 2006/0059557 | A1 | 3/2006 | Markham et al. | |
| 2006/0059963 | A1 | 3/2006 | Conforti | |
| 2006/0075492 | A1 | 4/2006 | Golan et al. | |
| 2006/0076420 | A1 | 4/2006 | Prevost et al. | |
| 2006/0102717 | A1 * | 5/2006 | Wood et al. | 235/382 |
| 2006/0106944 | A1 * | 5/2006 | Shahine et al. | 709/245 |
| 2006/0112423 | A1 | 5/2006 | Villadiego et al. | |
| 2006/0119469 | A1 * | 6/2006 | Hirai et al. | 340/5.61 |
| 2006/0136742 | A1 * | 6/2006 | Giobbi | 713/185 |
| 2006/0230019 | A1 | 10/2006 | Hill et al. | |
| 2006/0255129 | A1 * | 11/2006 | Griffiths | 235/382 |
| 2007/0046424 | A1 * | 3/2007 | Davis et al. | 340/5.8 |
| 2007/0046468 | A1 * | 3/2007 | Davis | 340/572.1 |
| 2007/0106754 | A1 | 5/2007 | Moore | |
| 2007/0186106 | A1 * | 8/2007 | Ting et al. | 713/168 |
| 2007/0250920 | A1 * | 10/2007 | Lindsay | 726/7 |
| 2008/0091944 | A1 * | 4/2008 | von Mueller et al. | 713/168 |
| 2008/0109098 | A1 * | 5/2008 | Moshier et al. | 700/103 |
| 2008/0129467 | A1 * | 6/2008 | Gennard | 340/286.11 |
| 2008/0189214 | A1 * | 8/2008 | Mueller et al. | 705/65 |
| 2008/0263640 | A1 | 10/2008 | Brown | |
| 2008/0277486 | A1 * | 11/2008 | Seem et al. | 236/49.3 |
| 2009/0050697 | A1 * | 2/2009 | Sparks et al. | 235/382.5 |
| 2009/0064744 | A1 * | 3/2009 | Wang | 70/278.1 |
| 2010/0023865 | A1 | 1/2010 | Fulker et al. | |
| 2010/0188509 | A1 * | 7/2010 | Huh | 348/156 |
| 2011/0006879 | A1 * | 1/2011 | Lambrou et al. | 340/5.64 |

* cited by examiner

ACCESS CONTROL SYSTEM AND METHOD USING USER LOCATION INFORMATION FOR CONTROLLING ACCESS TO A RESTRICTED AREA

BACKGROUND OF THE INVENTION

1. Field of the Invention

The present invention relates to access control systems, and more particularly to access control system which uses user location information to control access to a restricted area, where the location information is useful to provide more accurate muster and to prevent pass-back.

2. Description of the Related Art

A physical access control system (ACS) includes one or more access controllers which are used to restrict access to one or more restricted physical locations or areas by controlling controllable physical barriers, such as doors, turnstiles, elevators, gates, etc. A "physical" ACS is distinguished from a "logical" ACS which is used to restrict access to data or information on a computer system or the like. Each access controller is configured in any suitable manner for controlling a corresponding controllable barrier to control access to the restricted area, such as including a reader device (e.g., card reader or the like) along with an access device (e.g., door lock or the like). A user presents a token to the reader device, which determines whether the token is "valid" thus indicating an authorized user. If the token is valid, access is granted; otherwise, access is denied.

In a conventional ACS, there is little or no separate tracking of authorized users' locations so that users may leave at any time without further authentication or verification. It may be desired, however, to track which authorized users are located within the restricted area at any given time. It may further be desired to prevent "pass-back" in which one user passes a valid token (e.g., badge) back to another user (authorized or not) to enable both to enter the restricted area using the same token. Pass-back may be defeated or made more difficult by preventing a valid token from being re-used within a certain period of time. A timed non-reuse period, however, may cause inconvenience to authorized personnel. For example, an authorized user might immediately leave the restricted area (e.g., to retrieve a forgotten item from their car) and attempt re-entry within only a short time yet be denied if still within the timed non-reuse period.

A more sophisticated ACS includes authentication upon user exit to more carefully track authorized users located within the restricted area. Such systems often include a "muster" or the like, which is a list or database of authorized users located within the restricted area. In such access control systems, the exit process is similar to the entry process in which the user must present their valid token again to exit the restricted area. Exit authentication, however, presents several problems. A dual access ACS (including exit authentication) is relatively expensive since each entry location must be configured for dual access for both entry and exit. Also, a dual access ACS is often considered inconvenient by, and intrusive to, the authorized users. Dual access systems also require relatively high maintenance since such systems often make mistakes and require occasional reset to ensure accuracy. For example, a user may exit through another door, or through an unauthorized exit or the like, or may simply follow another user out the door resulting in an inaccurate muster. In addition, another person (authorized or not) may follow an authorized user through an entry point without authentication so that security is compromised or the muster is inaccurate. Furthermore, dual access systems limit or restrict the ability to exit the restricted area which may present safety challenges. A dual access system, for example, may prevent fast evacuation of the restricted area during an emergency situation or the like.

It is desired to provide more accurate tracking of authorized users, to defeat pass-back, and to improve muster accuracy of an ACS without the problems associated with dual access systems.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
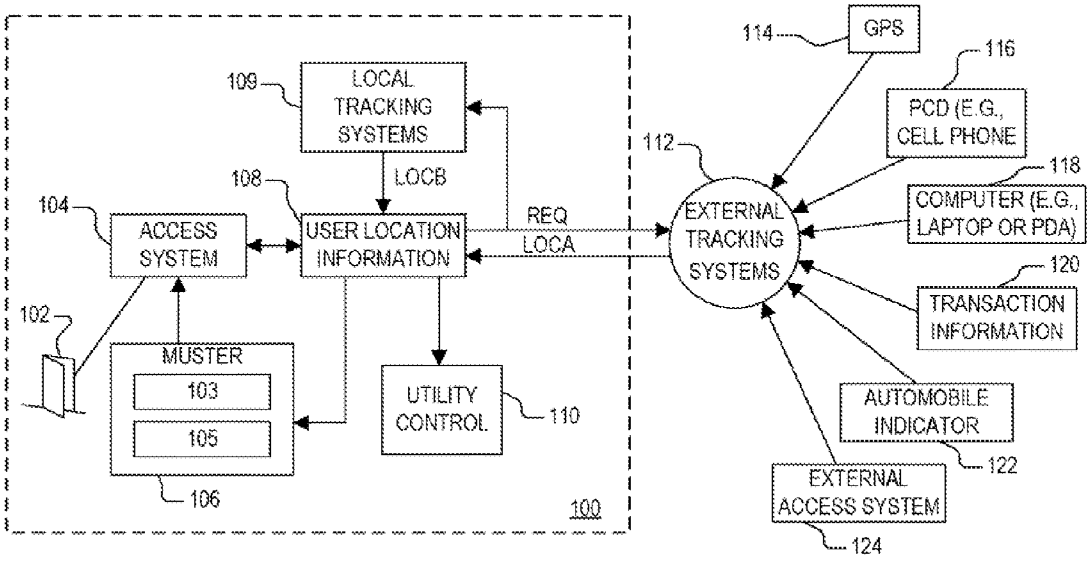
FIG. 1 is a block diagram of a physical access control system implemented according to an exemplary embodiment.
Figure 2:
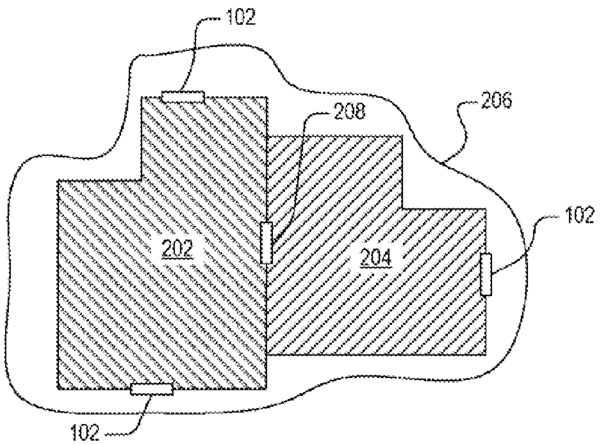
FIG. 2 is a figurative diagram illustrating an exemplary depiction of restricted areas and the corresponding surrounding local area associated with the access control system of FIG. 1.

FIG. 1 is a block diagram of a physical access control system 100 implemented according to an exemplary embodiment. A controllable barrier 102 is shown for controlling access to at least one restricted area, shown as contiguous restricted areas 202 and 204 (FIG. 2). The controllable barrier 102 is shown as a door, but it is understood that many other types of controllable physical barriers employed by physical access control systems are contemplated, such as doors, turnstiles, elevators, gates, etc. Also, any number of controllable barriers 102 may be included depending upon the restricted areas and restriction rules. An access system 104 is shown for controlling the controllable barrier 102. The access system 104 includes various devices and controllers of the access control system 100, such as one or more access controllers (not shown), local controllers (not shown), access servers (not shown) management consoles (not shown), etc. The access system 104 is configured in any suitable manner for controlling access to the restricted areas 202 and 204, such as including an access device (not shown) and a reader device (not shown). A reader device is configured to read or otherwise detect tokens provided by an authorized user (or possibly by a robot or other automated machine), such as biometric scanners (e.g., fingerprint, retinal, etc.), keypads, magnetic card readers, etc. The access system 104 further includes any type of memory (not shown) for storing a list or cache of tokens, including "valid" tokens used by authorized users to enable access to the restricted areas 202 and 204. Tokens may have any form as known to those skilled in the art, such as pin codes, data keys from access cards or badges, biometric patterns, etc. An access device is a mechanism enforcing restricted access and thus preventing unauthorized access. Each access device is configured for the particular type of controllable barrier, such as a strike unit for a door or a controlled latch for a gate or the like. If a valid token is provided to a reader device at an appropriate time, and if other conditions are met as further described below indicating that an authorized user is requesting access to the restricted areas 202 and 204, then the reader device controls the access device to open the physical barrier to enable the user to enter the restricted area.

In one embodiment, the access system 104 operates to receive a token via a reader device of a corresponding access device, compares the received token with the valid tokens in its local token cache, and reviews additional locality information to make an access decision, and grants or denies access depending upon the decision result. If the received token matches a stored valid token, then access is granted and the access device is controlled to grant access based on the access decision. If the received token is not valid (e.g., not found among the valid token list), then access is denied. Each token may be authorized for selected times or according to predetermined rules. In one embodiment, for example, a scenarios database or the like incorporates access rules, scheduling information, operational modes, etc., for maintaining the access information. A given token may have few, if any, limitations, meaning that it grants access to all restricted areas at all times. Other tokens may have certain qualifications or limitations, such as granting access only to selected restricted areas (e.g., access to restricted area 202 but not to restricted area 204), or granting access only for selected times, or granting access only for certain dates, or any combination of these limitations. Such qualifications are associated with scenarios, which describe general operational modes for the access system 104, including rules applied to each token. The scenarios encompass various operational modes, such as emergency situations or scheduled events or time periods. In general, the scenarios determine which tokens are authorized for which areas for which times and for which situations or conditions. Each token may further include flags or the like for turning on and off authorization or modifying access rules or scenarios or access conditions associated with that token. For example, selected tokens may be enabled or disabled during certain times or dates, such as daytime/nighttime or weekday/weekend, etc. It is appreciated by those skilled in the art that any number of flags may be defined for each token.

The access control system 100 further includes a muster 106, a user location information system 108, one or more local tracking systems 109, and a utility control system 110. The muster 106 includes a list of authorized users located within a corresponding restricted area at any given time. As shown, the muster 106 may include multiple muster lists, such as a first list 103 for the restricted area 202 and a second list 105 for the restricted area 204. The user location information system 108 receives location information for each of the authorized users from a variety of sources including the access system 104, external tracking systems 112, and the local tracking systems 109. As illustrated, the user location information system 108 updates the muster 106 based on the location and access decision information as further described below. In the illustrated embodiment, the user location information system 108 submits a request (REQ) for location information for selected authorized users (e.g., one or more up to all of the authorized users) to one or more of the external tracking systems 112, which respond with the requested location information of the authorized users via location signal or feed LOCA. The location signal may be via an external location feed or the like. In an alternative embodiment, the LOCA signal is updated automatically by the tracking systems 112 on a periodic basis, such as every half-hour or every hour or the like, and the REQ is omitted so that the user location information system 108 does not prompt for the location information. The local tracking systems 109 may also be prompted by the REQ signal to provide location information via a corresponding location signal LOCB. Examples of local tracking systems include local transactions (swipe of credit card at vendor machine within either restricted area 202 or 204) detected by a billing system, check-in or check-out at on-site facility, such as cafeteria, fitness center, health club, medical center, library, conference rooms, etc., or any other indication of physical location of an authorized user within the restricted areas 202 and 204.

The tracking systems 112 are implemented according to any one or more tracking configurations for tracking the location of the authorized users. One configuration includes a global positioning system (GPS) 114 including any type of GPS device or GPS transponder or the like. Another configuration includes any type of mobile personal communication device (PCD) 116 typically carried by users, such as cellular phone or a pager or a BlackBerry® or the like. In this configuration, the PCD 116 enables tracking of the location of the mobile devices via associated mobile communication services, such as cellular phone or paging services or the like. Tracking by PCD 116 may include cellular triangulation techniques or the like. Another configuration includes a computer device 118, such as a laptop computer or a personal digital assistant (PDA) or any other type of mobile device capable of providing location information. In one embodiment, the computer device 118 incorporates a transmitter the like (e.g., wireless network) indicating whether the device is located within either or both of the restricted areas 202 and 204. It is noted that if the computer device includes a GPS transponder or the like, it is otherwise considered a GPS 114. Another configuration includes transaction information 120 indicating a general location of the authorized user, such as credit card transactions, toll road transactions, etc. For example, a recent toll road transaction or parking garage transaction may indicate whether the user is within a local area 206 (FIG. 2) associated with the restricted areas 202 and 204. For example, a credit card transaction at a distant retail center may indicate that the authorized user is not located in the local area 206 (or might otherwise indicate an unauthorized transaction potentially raising an alarm). Another configuration includes any type of automobile tracking indicator 122, such as a license plate sensor or parking garage indication or the like. Another configuration includes another or external access system 124, such as an access system at a remote site. A user entering a remote site using a valid token provides an indication of location.

The user location information system 108 is interfaced to any one or more of the tracking systems 109 and 112 via any type of network incorporating any combination of wired or wireless communication methods. The network may be a closed system and/or otherwise a secure network. In another embodiment, the network includes less secure portions and may even be coupled to one or more public or larger networks, such as the public switched telephone network (PSTN) and/or the Internet and the like. In various embodiments, such as those including limited security or non-secure networks, secure communications may be facilitated using encrypted communication methods or channels. The network is configured to enable communications according to any suitable type of communication protocol as understood by those skilled in the art. Various methods are contemplated for providing the LOCA signal incorporating location information from the external tracking systems 112 to the local user location information system 108. The accuracy of the location information depends upon the configuration. A GPS transponder or cellular triangulation may provide relatively accurate location information of each authorized user (e.g., within a few yards or feet) whereas transaction information may provide only an indication that the user has traveled outside of the local area 206. Although the tracking systems 112 may be capable of continuously tracking the location of each authorized user at all times and almost any location, in one embodiment the user location information system 108 only employs the location information for determining whether the authorized users are inside or outside the local area 206.

The access system 104 generally provides a primary location tracking source whereas any other tracking source, including any of the external tracking systems 112 or the local tracking systems 109 provides an additional or supplemental tracking source. As further described herein, each supplemental tracking source is useful for providing additional authentication or verification information for making access decisions and for verifying information in the muster 106.

FIG. 2 is a figurative diagram illustrating an exemplary depiction of the restricted areas 202 and 204 (depicted using relative diagonal-line shading) and the corresponding surrounding local area 206 associated with the access control system 100. The restricted areas 202 and 204 are each typically bounded by permanent physical barriers, e.g., walls, fences, physical barriers, etc., and include one or more of the controllable barriers 102 for granting entry. In the illustrated embodiment, the restricted area 202 is located adjacent the restricted area 204 and access between the two is facilitated with another controllable barrier 208, which may be configured substantially identical to the controllable barrier 102 and controlled by the access system 104. The access system 104 provides location information to the user location information system 108 based on access control. For example, an authorized user located in the restricted area 202 and on the list 103 of the muster 106 may request access to the other restricted area 204 via the controllable barrier 208. If the access system 104 grants entry, the information is provided to the user location information system 108, which updates the authorized user location information and further updates the muster 106 (e.g., user moved from list 103 to list 105).

The local area 206 is shown completely surrounding or otherwise encompassing both of the restricted areas 202 and 204. The local area 206 represents location of the user within or "near" the restricted areas 202 and 204 including a reasonable buffer zone. The relative size of the buffer zone depends upon the relative accuracy and configuration of the location information. For relatively accurate location information tracking, such as GPS transponders and the like, the buffer zone may be relatively small, such as within a few feet or yards of the boundary of the restricted areas 202 and 204. For less accurate location information tracking, the buffer zone is generally larger, such as within a few hundred yards or even a mile or so of the restricted areas 202 and 204. As described further below, the local area 206 is used to determine whether an authorized user is within or near the restricted areas 202 and 204.

Figure 3:
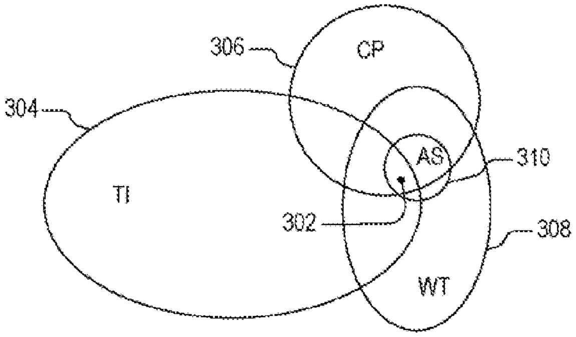
FIG. 3 is a Venn diagram illustrating an overlapping grid of relative location information used by the user location information system of FIG. 1 for determining location of an authorized user.

FIG. 3 is a Venn diagram illustrating an overlapping grid of relative location information used by the user location information system 108 for determining location of an authorized user. The authorized user is actually located at a point 302 at a particular time. Transaction information (TI) determines that the authorized user is located within a first area 304. A cell phone (CP) places the authorized user within a second area 306. A wireless transceiver (WT) places the authorized user within a third area 308. An access system (AS) places the user within a fourth area 310. The relative sizes of the areas 304-310 indicate the relative accuracy of the location information from the corresponding source. It is appreciated, however, that the relative accuracy may further be determined by the type of information. Transaction information, for example, may be accurate for a short period of time (e.g., placing a person at an exact location at a point in time or within an expanding area with increasing time), whereas GPS information may provide the most accurate information at any time, but only when available. In the illustrated case, the source providing location information for area 310 happens to be the most accurate. It is appreciated, however, that the common area (e.g., overlapping area) between any two of the areas 304-310 provides a reasonable determination of the location of the authorized user. For example, although the areas 304 and 308 may be relatively large, the overlap between areas 304 and 308 is significantly smaller and provides reasonable location information.

The user location information system 108 combines location information from any of the location sources that are available to minimize the possible location area of an authorized user. The location information may be combined in any suitable manner, such as by applying corresponding weighting factors to each location source based on relative accuracy. For example, transaction information may have a significantly lower weighting factor as compared to cellular phone location information. The overlapping areas of multiple sources may provide sufficiently accurate information. If two sources conflict, such as when location areas do not overlap, then in one embodiment the user location information system 108 uses the weighting factors or the like or rejects less accurate source information in order to make the location determination decision. In one embodiment, a mismatch or inconsistency between multiple sources may be used to raise an alarm for the system and/or for the user. For example, if multiple location information including a person's cellular phone indicates that the user is in the office while a concurrent transaction involving the user's credit card is detected at a gas station, an alarm may be raised indicating a potential unauthorized transaction.

Figure 4:
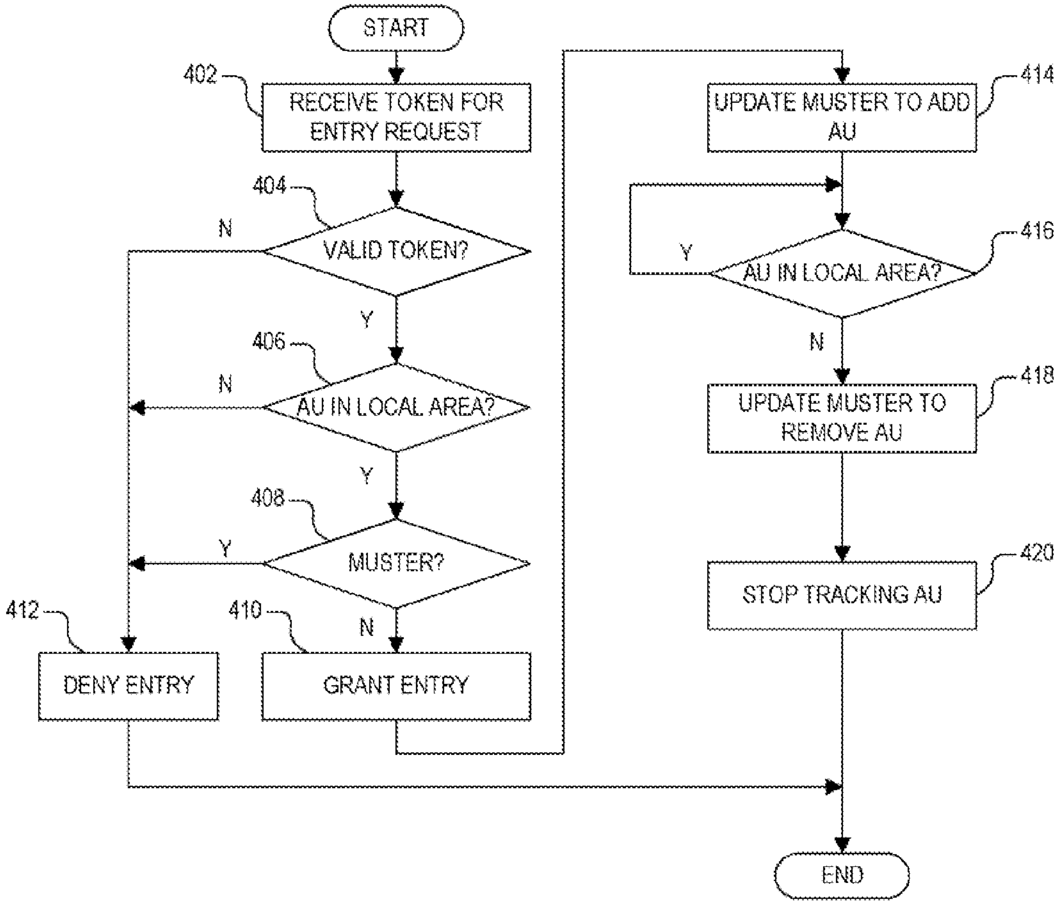
FIG. 4 is a flowchart diagram illustrating operation of the access control system of FIG. 1 for controlling any of the controllable barriers according to an exemplary embodiment.

FIG. 4 is a flowchart diagram illustrating operation of the access control system 100 for controlling any of the controllable barriers 102 or 208 according to an exemplary embodiment. Operation is primarily performed by the access system 104 for making access decision and the user location information system 108 for tracking location and updating the muster 106. At a first block 402, the access system 104 receives a token for requesting entry into one of the restricted areas 202 or 204. At next block 404, the access system 104 determines whether the received token is a valid token. A "valid" token indicates that the corresponding authorized user (AU) is granted entry at the given time and under any other conditions, if applicable. If the token is valid, operation proceeds to block 406 in which the access system 104 consults the user location information system 108 to determine whether the corresponding authorized user is located within the local area 206. It is noted that the authorized user may not actually be physically located within either restricted area 202 or 204 if requesting entry, but instead is determined to be located within the local area 206 and thus near the restricted areas 202 and 204 (e.g., at any of the controllable barriers 102 requesting entry). If the authorized user is determined to be in the local area 206 at block 406, operation proceeds to block 408 to query whether the authorized user is already on the muster 106. If the user is not on the muster 106 at block 408, operation proceeds to block 410 to grant entry to the authorized user.

The muster determination at block 408 is slightly more complicated when multiple muster lists are included. If the user is requesting access to the restricted area 202, then the access system 104 consults the muster list 103. If the user is requesting access to the restricted area 204, then the access system 104 consults the muster list 105. This is true for both controllable barriers 102 and 208.

If the token is not valid such that the "user" is not authorized as determined at block 404, then operation proceeds instead to block 412 and entry is denied and operation is completed. Otherwise, if the "authorized" user is not located in the local area 206 as determined at block 406, then operation proceeds instead to block 412 from block 406 and entry is denied and operation is completed. In this case, is it deemed that another person, possibly an unauthorized person, is improperly attempting access using a valid token since the authorized user is not located near the restricted areas 202 or 204. Otherwise, if the token is valid and the authorized user is in the local area 206 and the authorized user is already on the muster 106 (either muster list 103 or 105) as determined at block 408, then operation proceeds instead to block 412 from block 408 and entry is denied and operation is completed. In this case, pass-back is potentially defeated since the authorized user has already used the same token to grant entry to the restricted area 202 or 204.

If entry is granted at block 410, operation proceeds to block 414 in which the muster 106 is updated by the user location information system 108 to add the authorized user. If multiple lists are included within the muster 106 (e.g., 103 and 105), then only the appropriate list is updated. In one embodiment, the access decision is forwarded by the access system 104 to the user location information system 108. Operation then proceeds to block 416 in which it is queried (e.g., continuously, periodically, etc.) whether the authorized user remains within the local area 206. As long as the authorized user remains in the local area 206, operation remains or loops at block 416 and the location of the authorized user is tracked. If the authorized user travels outside the local area 206 as determined by the user location information system 108, then operation proceeds to block 418 in which the muster 106 is updated by removing the authorized user from the muster 106. Operation then proceeds to block 420 in which location tracking of the authorized user is terminated 420 and operation is completed. As previously noted, it is only desired to determine whether the authorized user is within or near the restricted areas 202 or 204 for purposes of maintaining an accurate muster 106 and defeating pass-back. Depending upon the particular configuration, the external tracking systems 112 may continue to track user location. In one embodiment, the user location information system 108 requests location information only when entry is requested and only until it is determined that the authorized user has left the local area 206.

In certain configurations, the access system 104 controls any one or more of various utilities associated with the restricted areas 202 and 204 via the utility control system 110 based on the location information and/or the muster 106. The utilities include any one or more of the utilities or components associated with a work facility or the like, such as lighting, air-conditioning (AC), telephone services, billing services, wireless networks, computer systems, etc. For example, if it is determined that an authorized user has left the restricted area 202, utilities or the AC may be turned down or shut off in that area, the user's phone may be forwarded (e.g., to cell phone), a wireless network may be reduced or turned off, selected lights may be turned off, etc.

A method of controlling access to a restricted area according to one embodiment of the present invention includes receiving location information from at least one supplemental tracking source which tracks location of an authorized user and controlling access by the authorized user to a restricted area based on the location information.

The method may include receiving a token to request entry into the restricted area and making an access decision. Making an access decision may include denying access if the received token is not valid or if the authorized user corresponding to the received token is not located near the restricted area, and granting access if the received token is valid and if the authorized user is located near the restricted area. The method may further include denying access if the authorized user is already on a muster and granting access if the authorized user is not on the muster. The method may further include adding the authorized user to a muster if the access is granted and removing the authorized user from the muster if the authorized user leaves the restricted area as indicated by the location information.

The method may include receiving location information based on cellular phone information, based on global positioning system information, based on transaction information associated with the authorized user, etc., or any combination thereof. The method may include receiving location information from at least one tracking system internal or external to the restricted area or any combination thereof. The method may include controlling at least one utility based on the location information and the muster. The method may include combining location information from multiple tracking sources using corresponding weighting factors.

A physical access control system for controlling access to a restricted area according to one embodiment includes a user location information system which receives location information indicating location of an authorized user from at least one supplemental tracking source, and an access system which controls access to the restricted area based on the location information.

In one embodiment of the physical access control system, the access system receives a token and denies access if the token is invalid or if the authorized user is not within a local area surrounding the restricted area, and which grants access if the token is valid and if the authorized user is within the local area. The access system may further deny access of the authorized user is already on a muster and grant access if the authorized user is not on the muster. The user location information system may further add the authorized user to the muster if access is granted and remove the authorized user from the muster if the authorized user leaves the local area.

In various embodiments, the user location information system receives cellular phone information, global positioning system information, transaction information associated with the authorized user, etc., or any combination thereof. The user location information system may combine location information from multiple tracking sources using corresponding weighting factors. The physical access control system may include at least one tracking system either external or local to the restricted area or any combination thereof. The physical access control system may further include a utility control system which controls at least one utility based on the location information.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A method of controlling access for an authorized user to a restricted area, comprising:

receiving, by an access system, a token to request entry into the restricted area, wherein the access system comprises a primary tracking source;

receiving supplemental location information from at least one supplemental tracking source which tracks location of the authorized user; and making an access decision, comprising granting access to the restricted area when the received token is valid, when the supplemental location information indicates that the authorized user is located near the restricted area, and when the authorized user is not on a muster, and otherwise denying access when the received token is not valid, or when the supplemental location information indicates that the authorized user is not located near the restricted area, or when the authorized user is already on the muster; and adding the authorized user to the muster when access is granted, and removing the authorized user from the muster when the supplemental location information indicates that the authorized user is not in the restricted area.

2. The method of claim 1, wherein said receiving supplemental location information comprises receiving location information based on cellular phone information.

3. The method of claim 1, wherein said receiving supplemental location information comprises receiving location information based on global positioning system information.

4. The method of claim 1, wherein said receiving supplemental location information comprises receiving location information based on transaction information associated with the authorized user.

5. The method of claim 1, wherein said receiving supplemental location information comprises receiving location information from at least one tracking system external to the restricted area.

6. The method of claim 1, wherein said receiving supplemental location information comprises receiving location information from at least one tracking system internal to the restricted area.

7. The method of claim 1, further comprising controlling at least one utility based on the supplemental location information and the muster.

8. The method of claim 1, further comprising combining location information from a plurality of tracking sources using corresponding weighting factors.

9. A physical access control system for controlling access for an authorized user to a restricted area, comprising:

a user location information system which receives supplemental location information indicating location of the authorized user from at least one supplemental tracking source; and a muster comprising a list of authorized users which are in the restricted area;

an access system, coupled to said user location information system and said muster, which comprises a primary location tracking system for receiving a token, and which controls access by said the authorized user to the restricted area based on said token, said muster, and said supplemental location information;

wherein said access system grants access only when said token is valid, when said authorized user is located within a local area surrounding the restricted area as indicated by said supplemental location information, and when said authorized user is not on said muster; and wherein said access system adds said authorized user to said muster when access is granted and removes said authorized user from said muster when said supplemental location information indicates that the authorized user is not within said local area.

10. The physical access control system of claim 9, wherein said user location information system receives cellular phone information.

11. The physical access control system of claim 9, wherein said user location information system receives global positioning system information.

12. The physical access control system of claim 9, wherein said user location information system receives transaction information associated with said authorized user.

13. The physical access control system of claim 9, further comprising:

a utility control system, coupled to said user location information system, which controls at least one utility based on said location information.

14. The physical access control system of claim 9, wherein said user location information system combines location information from a plurality of tracking sources using corresponding weighting factors.

15. The physical access control system of claim 9, wherein said at least one supplemental tracking source comprises at least one tracking system local to the restricted area.

16. The physical access control system of claim 9, wherein said at least one supplemental tracking source comprises at least one tracking system external to the restricted area.

* * * * *